(Model.)

W. H. FANNING.
WAGON RUNNING GEAR.

No. 298,564. Patented May 13, 1884.

WITNESSES:
Chas. Nider
C. Sedgwick

INVENTOR:
W. H. Fanning
BY Munn & Co.
ATTORNEYS.

UNITED STATES PATENT OFFICE.

WILLIAM H. FANNING, OF LAPEER, MICHIGAN.

WAGON RUNNING-GEAR.

SPECIFICATION forming part of Letters Patent No. 298,564, dated May 13, 1884.

Application filed January 7, 1884. (Model.)

*To all whom it may concern:*

Be it known that I, WILLIAM H. FANNING, of Lapeer, in the county of Lapeer and State of Michigan, have invented a new and useful Improvement in Wagons, of which the following is a full, clear, and exact description.

Reference is to be had to the accompanying drawings, forming a part of this specification, in which similar letters of reference indicate corresponding parts in all the figures.

Figure 1:
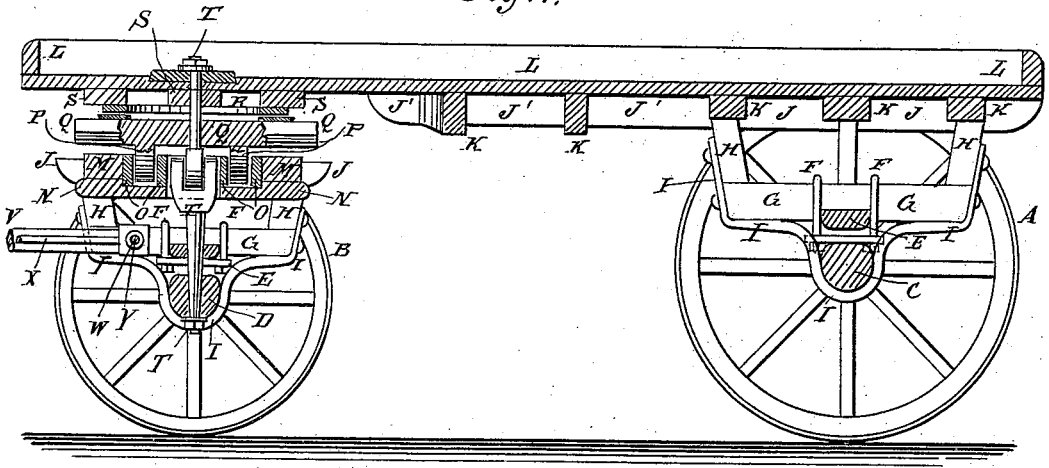
Figure 2:
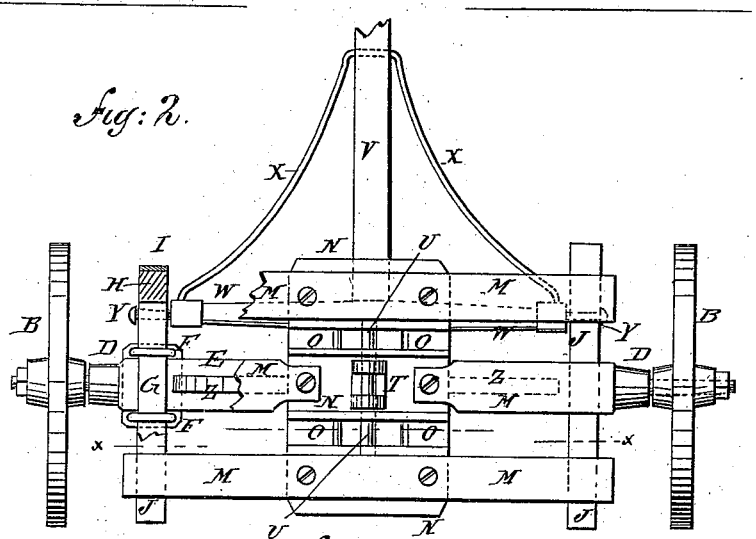
Figure 3:
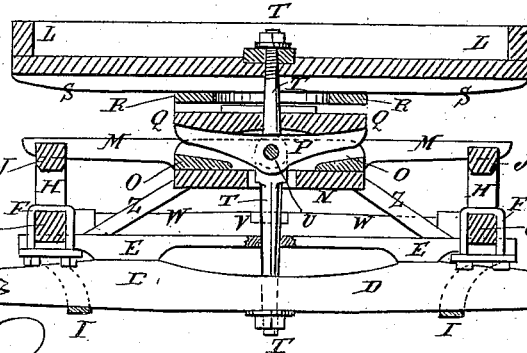

Figure 1 is a sectional side elevation of my improved wagon. Fig. 2 is a plan view of the forward part of the wagon, the body and rocker being removed and part being broken away. Fig. 3 is a sectional rear elevation of the forward part of the wagon, taken through the line $x\ x$, Fig. 2.

The object of this invention is to promote convenience and safety in using wagons upon farms and rough roads.

The invention consists in a wagon constructed with upright frames attached to the ends of the sand-boards and connected with the axles by braces to support the body and platform of the wagon. The top bars of the rear upright frames are extended forward to give a firm support to the wagon-body. To the front upright frames are attached platform-bars having secured to their lower sides a plate strengthened in place by inclined braces, and carrying grooved blocks upon which rest rounded blocks attached to a plate upon which rests the fifth-wheel attached to the wagon-body, the said parts being fastened together by a jointed king-bolt having its pivot extended to serve as a pivot to the rocking frames, as will be hereinafter fully described.

A are the rear wheels, and B are the forward wheels. C is the rear axle, and D is the forward axle, of a wagon.

To the axles C D are attached the sand-boards E, to the ends of each of which are secured by clips F the middle parts of the short bars G, placed at right angles with the said sand-boards E.

To the ends of each of the bars G are attached the lower ends of two short bars, H, which incline from each other slightly, as shown in Fig. 1.

To the lower corners of the frames G H are secured the ends of brace-bars I, which pass around the axles C D.

To the upper ends of the bars H of each pair is attached a bar, J. The rear bars J are made with forward extensions, J', and the said rear bars and their extensions are connected by cross-bars K.

To the bars J J' and the cross-bars K is attached the rear part of the wagon-body L.

To the forward bars J are framed the ends of three parallel bars, M, to the lower sides of the middle parts of which is attached a plate or frame, N.

To the plate N, between the platform-bars M, are attached blocks O, in the upper sides of which are formed concaved grooves to receive the rounded or convexed bars P, attached to the lower side of the plate or frame Q. The lower side of the parts of the plate Q above the bars M is rounded, to allow the said bars M to rock as the wheels B pass over uneven ground, and the plate Q to rock as the wheels A pass over uneven ground. The plate Q serves as the lower or movable part of the fifth-wheel, or has the said movable part of the fifth-wheel attached to it, and upon it rests the stationary part R of the fifth-wheel, which is attached to the cross-bars S, secured to the lower side of the forward part of the wagon-body L. The forward part of the wagon-body L is secured to the forward part of the wagon-gearing by the king-bolt T, which passes through the wagon-body L, the two plates Q N, the sand-board E, and the axle D, and has nuts screwed upon both ends. The king-bolt T is made in two parts jointed to each other at their adjacent ends by a rod, U, passing through the said ends and through the rounded bars or rockers P, the concaved bars O, and the side bars M, so that the forward part of the running-gear and the parts of the king-bolt will rock upon the same axis. The middle part of the center cross-bar M is cut away, as shown in Fig. 2, to make room for the joint of the king-bolt T, and the support of the plate N, weakened by the cutting away of the said center bar M, is strengthened by the inclined braces Z, the upper ends of which are attached to the said plate N, and their lower ends are attached to the sand-board E.

V is the tongue, the rear end of which is attached to the center of a cross-bar, W, the connection being strengthened by braces X, attached at their forward ends to the opposite sides of the said tongue V, and at their rear ends to the end parts of the said cross-bar W. The ends of the cross-bar W are pivoted to the forward parts of the forward bars, G, by a long bolt, Y, or other suitable means, so that the draft will be nearly on a level with the forward axle, D. With this construction the forward or rear part of the running-gear of the wagon can rock in passing over uneven ground independently of the other part, and without twisting or straining the wagon-body or any part of the running-gear. With this construction, also, the wagon can be turned in a very small space, as the forward wheels can readily pass in beneath the wagon-body.

Having thus described my invention, I claim as new and desire to secure by Letters Patent—

1. In a wagon, the combination, with the axles C D and the sand-boards E, of the body-supporting frame consisting of the bars G, secured to the ends of the sand-boards, the inclined bars H, secured to the bars G, and the brace-bars I, passing around the axles and having their ends secured to said bars G H, substantially as herein shown and described, and for the purpose set forth.

2. In a wagon, the rear frames, G H J, made with a forward extension, J', of their top bars, substantially as herein shown and described, whereby the wagon-body will receive a firm support, as set forth.

3. In a wagon, the combination, with the front frame, G H I, the platform-bars M, and the body L, of the plate N, having grooved blocks O, the plate Q, having rounded blocks P, the fifth-wheel S, and the jointed king-bolt T and its long pivot U, substantially as herein shown and described, whereby the forward and rear parts of the running-gearing can rock independently and without straining the wagon-body, as set forth.

WILLIAM H. FANNING.

Witnesses:
A. MESTON,
GEORGE B. CRAIN.